US012798154B2

(12) United States Patent
Bellio et al.

(10) Patent No.: US 12,798,154 B2
(45) Date of Patent: Nov. 17, 2026

(54) APPARATUS AND METHOD FOR TREATING INCOHERENT MATERIAL

(71) Applicant: PIOVAN S.P.A., Santa Maria di Sala (IT)

(72) Inventors: Enrico Bellio, Ponzano Veneto (IT); Davide Cappellini, Soncino (IT)

(73) Assignee: PIOVAN S.P.A., Veneto (IT)

( * ) Notice: Subject to any disclaimer, the term of this patent is extended or adjusted under 35 U.S.C. 154(b) by 997 days.

(21) Appl. No.: 17/795,396

(22) PCT Filed: Mar. 18, 2021

(86) PCT No.: PCT/IB2021/052260
§ 371 (c)(1),
(2) Date: Jul. 26, 2022

(87) PCT Pub. No.: WO2021/198832
PCT Pub. Date: Oct. 7, 2021

(65) Prior Publication Data

US 2023/0072327 A1 Mar. 9, 2023

(30) Foreign Application Priority Data

Apr. 3, 2020 (IT) ........................ 102020000007147

(51) Int. Cl.
*B29B 13/06* (2006.01)
*B29K 67/00* (2006.01)
*B29K 105/26* (2006.01)

(52) U.S. Cl.
CPC ...... *B29B 13/065* (2013.01); *B29K 2067/003* (2013.01); *B29K 2105/26* (2013.01)

(58) Field of Classification Search
None
See application file for complete search history.

(56) References Cited

U.S. PATENT DOCUMENTS 4,346,524 A * 8/1982 Wochnowski .......... F26B 25/22 131/303
2005/0066538 A1 3/2005 Goldberg et al.
(Continued)

FOREIGN PATENT DOCUMENTS

CN 106016989 A * 10/2016 ............ F26B 21/001
CN 208002013 U * 10/2018
(Continued)

OTHER PUBLICATIONS

May 28, 2021 International Search Report issued in International Patent Application No. PCT/IB2021/052260.
(Continued)

*Primary Examiner* — Jason Lau
(74) *Attorney, Agent, or Firm* — Oliff PLC

(57) ABSTRACT

An analysis method and apparatus for treating polymer granules at least part of which comes from post-consumer recycling, in which a flow of a process gas is purified from contaminating vapours by traversing, in sequence, first a dust collector filter that retains the solid particles contained in the gas, then a first side of a gas/gas heat exchanger in which the process gas surrenders heat, then a condenser in which the process gas is cooled to below the boiling point of the contaminating vapours to form condensate, then a second side of the exchanger in which the process gas recovers a part of the previously transferred heat, to then enter a container where the polymer granules are treated.

16 Claims, 4 Drawing Sheets

(56) References Cited

U.S. PATENT DOCUMENTS

| | | | | |
|---|---|---|---|---|
| 2008/0295354 | A1 | 12/2008 | Moretto | |
| 2009/0090019 | A1 | 4/2009 | Moretto | |
| 2016/0073678 | A1* | 3/2016 | Fujisawa ................ | A24B 15/24<br>131/297 |
| 2017/0245543 | A1* | 8/2017 | Karles .................... | A24B 15/16 |
| 2019/0107327 | A1 | 4/2019 | Ringdal et al. | |

FOREIGN PATENT DOCUMENTS

| | | | | |
|---|---|---|---|---|
| EP | 2447027 | A1 * | 5/2012 | ............ F26B 25/002 |
| KR | 101236381 | B1 * | 2/2023 | ........... B29B 13/065 |
| WO | 2005/077628 | A1 | 8/2005 | |
| WO | 2016/128849 | A1 | 8/2016 | |

OTHER PUBLICATIONS

May 28, 2021 Written Opinion of the International Searching Authority issued in International Patent Application No. PCT/IB2021/052260.

* cited by examiner

APPARATUS AND METHOD FOR TREATING INCOHERENT MATERIAL

BACKGROUND OF THE INVENTION

The invention relates to a method and/or an apparatus for treating plastics in an incoherent state, or plastics in the form of granules and/or micro granules and/or powder and/or flakes or the like.

Specifically, but not exclusively, the invention can be applied in a plant for treating incoherent plastics, such as, for example, a dehumidifying and/or drying and/or crystallizing plant and/or plant for conveying plastics in a vacuum and/or under pressure. This treatment plant may be intended, in particular, to feed at least one user machine, such as, for example, a machine for processing and transforming polymer material, in particular an extruder that supplies extruded polymer material to an injection and/or blow moulding and/or compression moulding apparatus.

Patent publication US 2019/107327 A1 discloses a processing apparatus according to the preamble of claim 1.

It is known, in the field of the treatment of plastics, to use a flow of a process gas that comes into direct contact with the plastics granules, for example for dehumidifying, drying, crystallizing, conveying, etc.

The increasingly widespread trend is further known to treat plastics that include non-insignificant percentages of products coming from recycling. In general, the suitability of plastics (for example PET) for post-consumer recycling depends on the quantity and nature of the contaminants present in the PET. It can be said that post-consumer contamination of the PET is the principal cause of deterioration of the physical and chemical properties of the PET during recycling. In order to improve the quality of the recycled PET, it is thus desirable to reduce the level of the contaminants.

The high melting temperature of the PET causes most of the contaminants to be transformed (for example polyvinyl chloride, paper, fibres, polyvinyl alcohol, adhesives, pigments, etc) into degraded and/or polluting products.

As can be observed in FIG. 1, the product obtained from post-consumer recycling can contain, in general, components that generate acid compounds, coloured fragments of the PET bottles, ink of the printed labels, acetaldehyde as a thermal degradation product of the PET during the extrusion process, cellulose fibres of the paper labels, impurities such as fragments of sand, stone, glass, bricks, metal, etc. These contaminants are known generally by the acronym N.I.A.S. (Non-Intentionally Added Substances).

In order to provide a purely illustrative example, in the field of food packaging with PET granules, the N.I.A.S. that arise from the material recycling process (rPET) may comprise products such as volatile organic compounds (hereinafter for the sake of brevity, VOC) and/or volatile organic solvents (hereinafter for the sake of brevity, VOS). Benzene, toluene and limonene are examples of VOCs. Aldehydes, ketones, esters, alcohols and nitroderivatives are examples of VOSs. VOC/VOS emissions are becoming critical in the field of plastics moulding, in particular because of the use of increasingly large percentages of recycled material in addition to virgin material. This is particularly felt in the sector of food packaging, where it is possible that VOCs/VOSs come into contact with the packaged product. Bottles for containing liquids and multi-layered film for packaging foods are examples of food packaging. It is thus necessary to monitor and regulate the percentage of VOC/VOS present in packages.

One feature of these contaminants is the relatively low boiling point thereof. By way of example, the boiling temperatures are shown below of contaminants that were identified experimentally in recycled plastics:

acetaldehyde=20.4° C. (293.6 K),
benzene=80.15° C. (353.3 K),
toluene=110.6° C. (383.8 K),
formaldehyde=—19.0° C. (254.1 K),
methylene=40° C. (313 K).

The prior art already comprises system of abatement by condensations for separating these contaminants contained in a process gas, in which the polluting vapours present in the process gas are taken from gaseous state to liquid state and then evaluate the liquefied contaminants. The efficiency of these abatement systems of known type can be considered to be, approximately:

- greater than 95% if the concentration of contaminants is greater than 5000 ppm;
- comprised between 90% and 95% if the concentration of contaminants is comprised between 2500 ppm and 5000 ppm;
- comprised between 50% and 90% if the concentration of contaminants is comprised between 500 ppm and 2500 ppm.

When treating incoherent plastics, in which the concentration of contaminants is in general less than 500 ppm, the efficiency of known system of abatement by condensations is thus relatively low. In order to improve this efficiency, it is possible to reduce the condensation temperature, which nevertheless involves a significant outlay of energy. On the other hand, it is possible to improve efficiency by increasing the operating pressure of the system of abatement by condensation, but this would result in high operating and maintenance costs of the compression means that is necessary to increase operating pressure.

Another problem of systems of known type for condensation abatement of a process gas is due to the fact that the flowrate of the process gas to be purified can be significantly variable, to adapt to the actual conditions of the process (for example dehumidification of the incoherent plastics). This causes a reduction of the efficiency of the system of abatement by condensation, especially at higher flowrates, for example for flowrates of the process gas above the dragging limit value of the condensate drop. The system of abatement by condensation thus currently needs to be over dimensioned to ensure the efficiency of the system also in the condition of maximum flowrate of the process gas, although this entails a certain reduction in the efficiency of the condensation in minimum flowrate conditions because of the non-optimal heat exchange situation between the condensing surface and the process gas to be purified.

SUMMARY OF THE INVENTION

One object of the invention is to overcome one of more of the aforesaid limits and drawbacks of the prior art.

One object is to provide a method and/or an apparatus for treating incoherent plastics by a process gas purified with a high-efficiency system of abatement by condensation.

One advantage is to treat incoherent plastics (in particular plastics containing at least a percentage of recycled product) with a process gas that is purified with relatively low energy consumption.

One advantage is to purify a process gas, used for treating incoherent plastics, using a condenser with relatively high efficiency also with variations in the flowrate of the process gas.

One advantage is to permit significantly effective purification from the VOC/VOS contaminant substances contained in the process gas.

One advantage is to avoid or reduce the contact between the process gas and the condensate that forms in the condensation abatement system.

One advantage is to devise a constructionally simple and cheap apparatus for treating incoherent plastics.

One advantage is to ensure effective abatement of polluting vapours, in particular vapours of organic compounds contained in a process gas used in a treatment of polymer granules, in particular in the case of relatively low concentrations of polluting vapours and of relatively high flowrates of the process gas.

One advantage is to obtain effective abatement of polluting vapours in a process gas that circulates continuously in a closed circuit that traverses a container where incoherent plastics are treated.

One advantage is to provide a treatment apparatus and/or method that uses a process gas that is decontaminated, in particular from VOC/VOS substances, with high efficacy and low energy consumption.

Such objects and advantages, and still others, are achieved by an apparatus and/or a method according to one or more of the claims set out below.

In one embodiment, a method for treating incoherent plastics comprises the operation of purifying a flow of a process gas from contaminating vapours by passing the flow of gas, in sequence, first through a dust collector filter to retain solid particles contained in the process gas, then through a first side of a heat exchanger in which the gas yields heat, then through a condenser in which the gas is cooled to below the boiling point of the contaminating vapours to form condensate, thus through a second side of the aforesaid exchanger to recover at least a part of the previously transferred heat, after which the purified process gas is supplied to a zone where the incoherent plastics are treated.

The heat exchanger permits heat recovery that, in addition to achieving energy saving, improves the efficiency of purification. The process gas in the exchanger undergoes cooling before entering the condenser, improving condensation, then undergoes heating after the condensation process, recovering a large part of the heat removed by the condenser. The heat exchanger, by lowering the temperature of the gas to be condensed, enables the energy to be reduced that is consumed to cool the refrigerating fluid used by the condenser.

It is in particular possible for the flow of process gas, after traversing the second side of the exchanger, to pass through an absorption filter, for example of the active carbon type, to receive heat. Alternatively, the flow of process gas can traverse an (active carbon) absorption filter arranged upstream of the first side of the exchanger. In other embodiments, the flow of process gas can traverse a first (active carbon) absorption filter arranged upstream of the first side of the exchanger and a second (active carbon) absorption filter arranged downstream of the second side of the exchanger.

It is possible to provide, in particular for the flow of process gas, after traversing the second side of the exchanger (and possibly after traversing the absorption filter, if present) to pass through a dehumidification device, for example a molecular sieve dehumidification device.

BRIEF DESCRIPTION OF THE DRAWINGS

The invention can be better understood and implemented with reference to the attached drawings that illustrate non-limiting embodiments thereof, in which.

DETAILED DESCRIPTION

Figure 1:
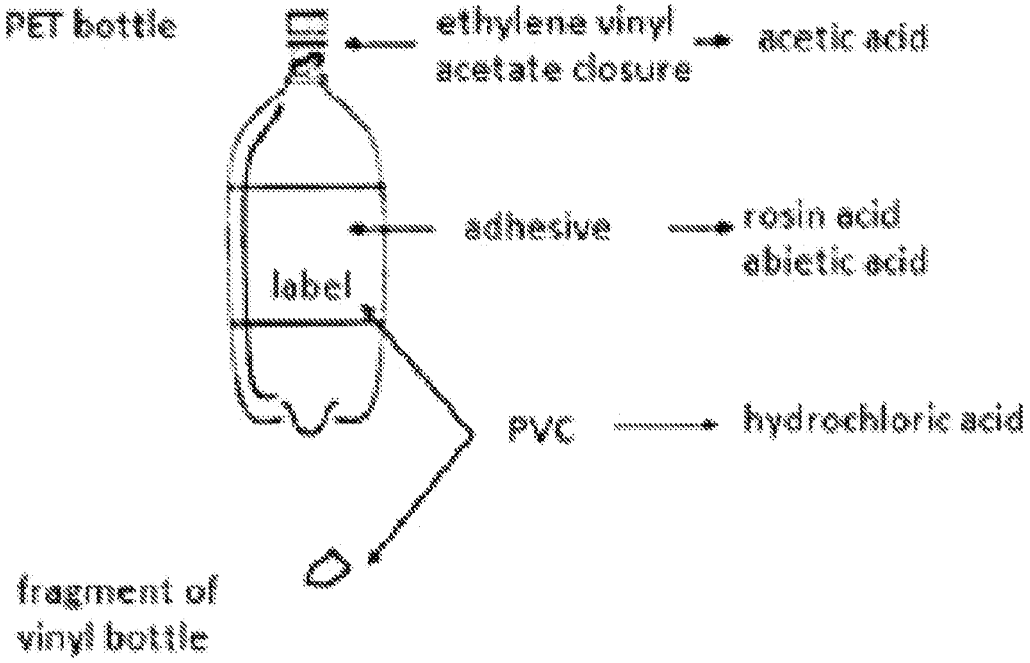
FIG. 1 shows an embodiment of a non-exhaustive list of polluting substances that can derive from recycling a PET bottle.

With reference to the aforesaid figures, analogous elements of different embodiments have been given the same numbering for simplicity and clarity.

A treatment apparatus for treating incoherent plastics, in particular plastics in the form of granules and/or micro granules and/or powder and/or flakes or the like has been numbered overall as 1. In the specific embodiments, the treatment apparatus 1 comprises a dehumidification apparatus of the incoherent plastics (polymer granules). In other embodiments, which are not illustrated, the treatment apparatus could comprise a crystallization apparatus of the incoherent plastics and/or an apparatus for conveying in a vacuum the incoherent plastics and/or an apparatus for conveying under pressure the incoherent plastics, etc.

The treatment apparatus 1 may comprise, in particular, at least one container 2 where the incoherent plastics are treated. The container 2 may comprise, in particular, a dehumidification hopper.

The container 2 may comprise, in particular, at least one inlet 3 of the incoherent material and at least one outlet 4 of the incoherent material. The container 2 may comprise, in particular, at least one inlet 5 of a process gas that comes into contact with the incoherent material in the container 2 and at least one outlet 6 of the process gas. The treatment apparatus 1 may comprise, in particular, at least one supply device 7 configured to supply the incoherent material (polymer granules) to the inlet 3 for the material entering the container 2.

The treatment apparatus 1 may comprise, in particular, at least one supply line 8 for supplying a process gas to the inlet 5 for the process gas entering the container 2. The treatment apparatus 1 may comprise, in particular, at least one flow generator 9 for generating a flow of the process gas along the supply line 8 to the inlet 5 for the process gas entering the container 2. The flow generator 9 may comprise, in particular, at least one fan.

The treatment apparatus 1 may comprise, in particular, at least one condenser 10 arranged along the supply line 8 to condense the contaminating vapours (in particular organic compound vapours) contained in the flow of the process gas. The contaminating vapours may be, in particular, released into the process gas by the incoherent plastics that are treated (in particular introduced into the container 2) and which could include high percentages of recycled material. The condenser 10 is configured, in particular, to lower the contaminating vapours by condensation. Substantially, the condenser 10 enables the contaminant products to be removed that are in the flow of the process gas by changing the physical state of the products from gas to liquid. Once the contaminant products have been liquefied they are evacuated.

The condenser 10 may comprise, in particular, at least one contaminated gas inlet 11 and at least one purified gas outlet 12. The condenser 10 may comprise, in particular, at least one refrigerating fluid inlet 13 and at least one refrigerating fluid outlet 14. The condenser 10 may comprise, in particular, a heat exchanger with at least one cooling unit (for example finned) that is traversed by the process gas to be condensed, in particular in a direction that is transverse (for example orthogonal) to a path of a refrigerating fluid (in particular a liquid, for example water) that flows inside a pipe system.

The treatment apparatus 1 may comprise, in particular, a refrigerating circuit 15 where the refrigerating fluid (as said, for example water) circulates. The refrigerating circuit 15 supplies the refrigerating fluid to the condenser 10. The refrigerating circuit 15 may comprise, in particular, at least one thermal machine 16 configured to remove heat from the refrigerating fluid. The thermal machine 16 may comprise, in particular, a refrigerator or refrigerating unit. The refrigerating circuit 15 may comprise, in particular, flow control means 17 configured to modulate the flow of the refrigerating fluid in the refrigerating circuit 15. The flow control means 17 may comprise, in particular, at least one flowrate adjusting valve and/or at least one circulating pump of the fluid in the refrigerating circuit 15. The flow control means 17 may be connected, in particular, to electronic control means to regulate the flow in the refrigerating circuit 15.

The condenser 10 may comprise, in particular, evaporating means where the refrigerating flow circulates that is suitable for cooling the flow of the process gas below boiling point, such that the contaminating vapours contained in the process gas can form a condensate. The condenser 10 may comprise, in particular, at least one tank 18 to connect the condensate formed by the evaporating means.

The condenser 10 may comprise, in particular, an evacuation device 19 for evacuating the condensate from the tank 18 towards a drain D. The evacuation device 19 may comprise, in particular, at least one circulating pump of the condensate and/or at least one flowrate adjusting valve.

The condenser 10 may comprise, in particular, a sensor 20 configured to detect the quantity of condensate that collects in the tank 18. The sensor 20 may comprise, in particular, a level sensor to detect the level of the condensate collected in the tank 18.

It is possible, in other embodiments, for a sensor of the quantity of condensate to comprise a weight sensor to detect the weight of the condensate that collects in the tank 18 and/or a flow sensor to detect the flowrate of the condensed liquid generated by the evaporative means, etc.

The treatment apparatus 1 may comprise, in particular, control means (for example programmable electronic control means comprising, in particular, at least one electric processor, which is not shown) configured to regulate the evacuation device 19 on the basis of signals supplied by the sensor 20. In particular, the evacuation device 19 may be controlled as a function of the quantity of condensate that collects in the tank 18 and is monitored by the sensor 20.

In particular, the evacuation device 19 may be controlled so as to maintain substantially constant the level in the tank 18 (level detected by the sensor 20) at a set value. In particular, the evacuation device 19 may be controlled intermittently so as to evacuate the condensate that has collected in the tank 18 (in particular so as to substantially empty the tank 18 to convey all the condensate collected in the tank 18 to the drain D) when the level reached by the condensate in the tank 18 reaches a set value.

The treatment apparatus 1 may comprise, in particular, (programmable electronic) control means configured to adjust the supply flow of the refrigerating fluid to the condenser 10 (in particular, the flow in the refrigerating circuit 15), used to cool the process gas and condense the contaminating vapours, in function of the quantity of condensate that collects in the tank 18 in the unit of time (i.e. substantially the formation speed of the condensate generated by the evaporative means), in particular on the basis of signals supplied by the sensor 20, for example with a feedback adjustment system (for example PI or PID).

The control means may be configured, in particular, to increase, or decrease, the cooling intensity supplied by the flow of the refrigerating fluid in response, respectively, to a decrease, or to an increase, of the quantity of condensate that collects in the tank 18 in the unit of time (for example with a feedback adjustment system, in particular PI or PID). The increase, or the decrease, of the cooling intensity supplied by the cooling flow that supplies the condenser 10 may be obtained, in particular, by intervening on the flowrate of the refrigerating fluid (for example by acting on the flow control means 17) and/or intervening on the temperature of the refrigerating fluid (for example by acting on the thermal machine 16).

In practice, if the forming speed of the condensate decreases, the cooling intensity may be increased by increasing the flowrate of the cooling flow and/or lowering the temperature of the cooling flow, whereas, on the other hand if the forming speed of the condensate increases, the cooling intensity may be reduced by a decrease of the flowrate of the cooling flow and/or an increase of the temperature of the cooling flow.

The control means may be configured, in particular, to set an initial operating situation of the cooling flow (in particular an initial value of the flowrate of the cooling flow and an initial value of the temperature of the cooling flow), established at least as a function of one of the following three operating parameters: the type of treatment of the incoherent plastics, or the type of plastics to be treated, or the percentage of recycled plastics present in the material to be treated, or in function of any combination of the aforesaid three parameters. It is possible, in particular, to start the refrigerating circuit 15 setting the initial operating situation and then (gradually) lower the temperature of the refrigerating fluid until the first condensation is obtained. Subsequently, it is possible, in particular, to control the refrigerating fluid (temperature and/or flowrate) such that, for example, the forming speed of the condensate (determinable in real time by the sensor 20) is substantially the same as a set value.

The treatment apparatus 1 may comprise, in particular, at least one exchanger 21 (in particular one gas/gas heat exchanger) arranged along the supply line 8 to cool the flow of the process gas.

The exchanger 21 may comprise, in particular, at least one first exchanger side that in turn comprises at least one gas to be cooled inlet 22 and at least one cooled gas outlet 23. The exchanger 21 may comprise, in particular, at least one second side exchanger that in turn comprises at least one cooling gas inlet 24 and at least one heated gas outlet 25. It is pointed out, for the sake of greater clarity, that the first side of the exchanger 21 is, in general, hotter than the second side. The outlet of the second side of the exchanger 21 is called "heated gas outlet" because in transit through the second side of the exchanger the gas is heated, although, in general, the temperature of the process gas at the heated gas outlet 25 in the second side ("cold" side) of the exchanger 21 will be lower than the temperature of the process gas at the gas to be cooled inlet 22 in the first side ("hot" side) of the exchanger 21.

The exchanger 21 may comprise, in particular, a gas/gas heat exchanger, for example of the tube bundle and/or plate type, in which the process gas on the first side (inlet side, or hot side) meets the process gas on the second side (outlet side, or cold side), where both the gas in the inlet side and in the gas in the outlet side flow into the same supply line 8. In the exchanger 21, the process gas on inlet side (which is located before the condenser 10) yields heat to the process gas on the outlet side (which is located after the condenser 10). In practice, the process gas on the outlet side recovers part of the heat yielded on the inlet side and the process gas on the inlet side gains part of the cold supplied by the condenser 10.

The supply line 8 may comprise, in particular, at least one connection portion 26 that connects the cooled gas outlet 23 of the exchanger 21 to the contaminated gas inlet 11 of the condenser 10.

The supply line 8 may comprise, in particular, at least one recirculation portion 27 that connects the purified gas outlet 12 of the condenser 10 to the cooling gas inlet 24 of the exchanger 21.

The supply line 8 may comprise, in particular, at least one delivery portion 28 that connects the heated gas outlet 25 of the exchanger 21 to the process gas inlet 5 of the container 2.

The supply line 8 may comprise, in particular, at least one withdrawal portion 29 that connects a source of a process gas to the gas to be cooled inlet 22 of the exchanger 21. The aforesaid source of a process gas may comprise, as in the specific embodiments, the outlet 6 of the process gas from the container 2, so that the withdrawal portion 29 may actually connect the outlet 6 of the process gas from the container 2 to the gas to be cooled inlet 22 of the exchanger 21. In this manner, the supply line 8 of the process gas starts and ends with the container 2, substantially giving rise to a closed circuit.

The treatment apparatus 1 may comprise, in particular, at least one absorption filter 30, for example an active carbon filters, configured to purify the flow of the process gas. The absorption filter 30 may be arranged along the supply line 8. In particular, the absorption filter 30 may be arranged, as in the embodiment in FIG. 2, along the delivery portion 28 of the supply line 8 (downstream of the heated gas outlet 25 of the exchanger 21). The absorption filter 30 may be arranged, as in the embodiment in FIG. 3, along the withdrawal portion 29 of the supply line 8 (upstream of the gas to be cooled inlet 22 of the exchanger 21.

The treatment apparatus 1 may comprise, in particular, at least one dust collector filter 31 configured to retain solid particles (powder) contained in the flow of the process gas. The dust collector filter 31 (for example a sleeve filter) may be arranged, in particular, along the supply line 8, in particular before the gas to be cooled inlet 22 of the exchanger 21.

It is understood that the terms "before", "after", "upstream" "downstream", refer to the direction of the flow of process gas in the supply line 8 towards the process gas inlet 5 in the container 2.

The dust collector filter 31 may be arranged, in particular, along the withdrawal portion 29 of the supply line 8. When the possible absorption filter 30 is arranged, as in the embodiment in FIG. 3, along the withdrawal portion 29, the dust collector filter 31 may be arranged, in particular, along the withdrawal portion 29 before the absorption filter 30. The dust collector filter 31 may belong, in particular, to an integrated system (which is not shown) which could include, in addition to the dust collector filter 31, the condenser 10 and/or the exchanger 21 and/or the absorption filter 30.

The treatment apparatus 1 may comprise, as in the specific embodiments that relate to a dehumidification apparatus, a dehumidification device 32 configured to dehumidify the flow of the process gas. The dehumidification device 32 may be arranged, in particular, along the delivery portion 28 of the supply line 8. The dehumidification device 32 may be arranged, in particular, downstream of the absorption filter 30, if present on the delivery portion 28.

The dehumidification device 32 may comprise, in particular, a molecular sieve device. The dehumidification device 32 may comprise, in particular, at least one dehumidification unit. The dehumidification device 32 may comprise, as in the specific examples illustrated, at least two dehumidification units arranged parallel. The dehumidification device 32 may comprise, in particular, at least two molecular sieve dehumidification units arranged parallel and configured to perform, in a manner alternating with one another, treatment steps (in which they absorb humidity from the process gas) and regeneration steps (in in which the humidity absorbed in the treatment steps comes as a flowrate).

The treatment apparatus 1 may comprise, in particular, at least one heater 33 arranged along the supply line 8, for example near the process gas inlet 5 in the container 2, to heat the dehumidified process gas before entering the container 2. The heater 33 may be thermoset. The heater 33 may be controlled by sensor means that measures the temperature of the process gas that enters through the inlet 5 of the container 2.

The treatment apparatus 1 may comprise, in particular, at least one temperature sensor T, at least one pressure sensor P and at least one humidity sensor H arranged along the supply line 8 to measure temperature, pressure and humidity (absolute and/or relative) of the process gas.

The treatment apparatus 1 may comprise, in particular, at least one temperature sensor T arranged along the supply line 8 to measure the temperature of the process gas. The temperature sensor T may be arranged, in particular, in the withdrawal portion 29 of the supply line 8. The treatment apparatus 1 may comprise, in particular, at least one pressure sensor P arranged along the supply line 8 to measure the pressure of the process gas. The pressure sensor P may be arranged, in particular, in the withdrawal portion 29 of the supply line 8. The treatment apparatus 1 may comprise, in particular, at least one humidity sensor H arranged along the supply line 8 to measure the humidity (absolute humidity and/or relative humidity and/or dew point) of the process gas. The humidity sensor H may be arranged, in particular, in the withdrawal portion 29 of the supply line 8.

The treatment apparatus 1 may comprise, in particular, at least one temperature sensor (which is not shown) arranged along the delivery portion 28 of the supply line 8 to measure the temperature of the process gas. The treatment apparatus 1 may comprise, in particular, at least one pressure sensor (which is not shown) arranged along the delivery portion 28 of the supply line 8 to measure the pressure of the process gas. The treatment apparatus 1 may comprise, in particular, at least one humidity sensor (which is not shown) arranged along the delivery portion 28 of the supply line 8 to measure the humidity (absolute humidity and/or relative humidity and/or dew point) of the process gas.

The treatment apparatus 1 may comprise, in particular, at least one temperature sensor (which is not shown) arranged along the connection portion 26 of the supply line 8 to measure the temperature of the process gas. The treatment apparatus 1 may comprise, in particular, at least one pressure sensor (which is not shown) arranged along the connection portion 26 of the supply line 8 to measure the pressure of the process gas. The treatment apparatus 1 may comprise, in particular, at least one humidity sensor (which is not shown) arranged along the connection portion 26 of the supply line 8 to measure the humidity (absolute humidity and/or relative humidity and/or dew point) of the process gas.

The treatment apparatus 1 may comprise, in particular, at least one temperature sensor (which is not shown) arranged along the recirculation portion 27 of the supply line 8 to measure the temperature of the process gas. The treatment apparatus 1 may comprise, in particular, at least one pressure sensor (which is not shown) arranged along the recirculation portion 27 of the supply line 8 to measure the pressure of the process gas. The treatment apparatus 1 may comprise, in particular, at least one humidity sensor (which is not shown) arranged along the recirculation portion 27 of the supply line 8 to measure the humidity (absolute humidity and/or relative humidity and/or dew point) of the process gas.

The treatment apparatus 1 may comprise, in particular, at least one sensor to measure the temperature of the refrigerating fluid (water or other refrigerating liquid.

The aforementioned pressure sensors may be used, in particular, to report faults, for example clogging, in the circuit of the process gas.

The treatment apparatus 1 may comprise, in particular, at least one sensor for detecting the level of liquid in a collecting container arranged in the drain D.

The treatment apparatus 1 may comprise, in particular, at least one flow sensor for determining the flowrate and/or the speed of the process gas along the supply line 8. The treatment apparatus 1 may comprise, in particular, at least one flow sensor for determining the flowrate and/or the speed of the fluid in the refrigerating circuit 15.

The operation of the treatment apparatus 1 actuates a treatment method, in particular dehumidification, which may comprise the step of introducing incoherent plastics into the container 2 where material treatment occurs.

The treatment method may comprise, in particular, the step of supplying a flow of a process gas along the supply line 8. The flow of the process gas passes, in sequence, through the first side of the exchanger 21, where the process gas yields heat (entering the gas to be cooled inlet 22 and exiting the cooled gas outlet 23), then through the condenser 10, where the contaminating vapours contained in the process gas are condensed (entering by the contaminated gas inlet 11 and exiting the purified gas outlet 12), then through the second side of the exchanger 21, where the process gas receives heat (entering by the cooling gas inlet 24 and exiting by the heated gas outlet 25).

The treatment method may comprise, in particular, the step of conveying the flow of process gas from the heated gas outlet 25 to the process gas inlet 5 of the container 2. The treatment method may provide, in particular for the flow of process for the gas to come from the outlet 6 of the process gas of the container 2.

The treatment method may comprise, in particular, the step of circulating a refrigerating flow in the evaporating means of the condenser 10 to cool the flow of the process gas to below a characteristic boiling point of the contaminants present in the recycled materials (in particular below the condensation temperature generally comprised between 70° C. and 20° C.), so that the contaminating vapours contained in the process gas form a condensate that is collected in the tank 18.

The treatment method may comprise, in particular, the step of detecting the quantity of condensate that reaches the tank 18. The treatment method may provide, in particular, for detecting the level of condensate collected in the tank 18, and/or detecting the flowrate of condensate that arrives in the tank 18.

The treatment method may comprise, in particular, the step of adjusting the refrigerating flow as a function of the quantity of condensate that reaches the tank 18 in the unit of time, so as to increase or decrease the cooling intensity supplied by the refrigerating flow in response, respectively, to a decrease or to an increase of the quantity of condensate that reaches the tank 18 in the unit of time.

It is possible to vary the cooling intensity supplied by the refrigerating flow by varying the flowrate and/or the temperature of the refrigerating flow.

The treatment method may comprise, in particular, the step of purifying the flow of the process gas along the supply line 8 by the absorption filter 30. The treatment method may comprise, in particular, the step of removing powder from the flow of the process gas by the dust collector filter 31. The treatment method may comprise, in particular, the step of dehumidifying the flow of the process gas by the dehumidification device 32.

It has been seen that the refrigerating flow that supplies the condenser may be controlled (by adjusting the flowrate and/or the temperature of the refrigerating fluid with a feedback adjustment system) on the basis of the signals supplied by the sensor 20 that detects the formation of condensate, in particular as a function of the forming speed of the condensate. Owing to this, the condenser may operate at high efficiency even if the features of the process gas vary, in particular if the percentage of contaminating vapours contained in the process gas varies.

Experiments have established the presence of relatively high quantities of acetaldehyde (treating PET with high percentages of product coming from post-consumer recycling), with the resulting need to adopt a condensation temperature (the temperature of the process gas in the condenser 10) that is significantly lower than the process temperatures in PET dehumidification treatment, in particular at the temperature (about 70-100° C.) that the process gas generally has at the outlet of the container 2 (dehumidification hopper).

The condensation temperature, i.e. the temperature reached by the process gas in the condenser 10, is controlled (in particular by acting on the flowrate and/or on the temperature of the refrigerating fluid) so as to be the same as or lower than the boiling temperature of at least one contaminating substance, in particular acetaldehyde, or benzene, or toluene, or formaldehyde, or methylene, etc.

It was also established that the evacuation device 19 reduces the risk of contact between the surface of the condensed liquid formed by the condenser 10 and the process gas that flows into the condenser 10.

Figure 2:
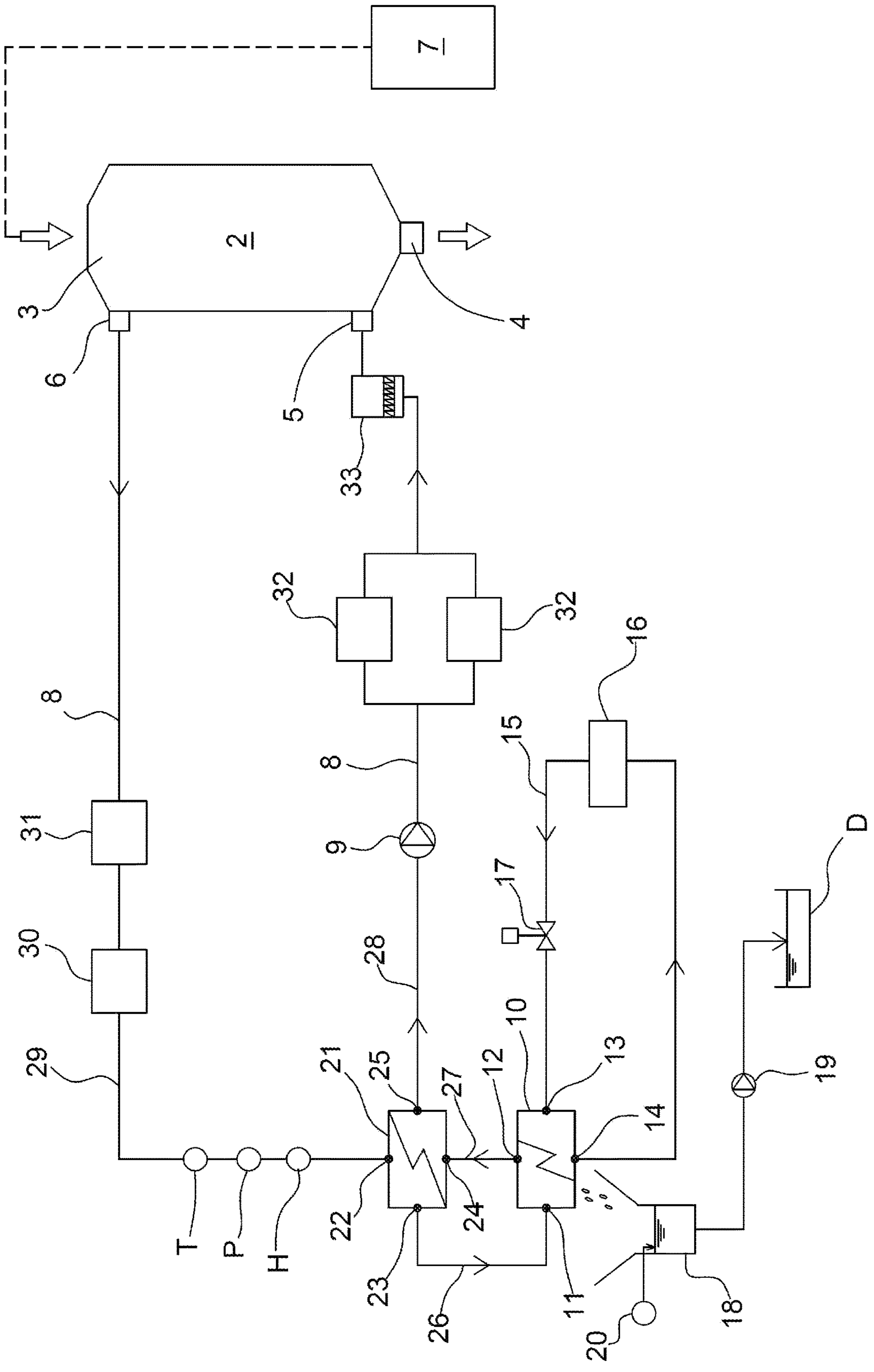
FIG. 2 shows a first embodiment of a treatment apparatus of incoherent plastics in accordance with the present invention.

Further, it has been noticed that, in the apparatus embodiment of FIG. 2, the efficiency of the absorption filter 30 is relatively high, as the absorption filter 30 is arranged in the delivery portion 28 in which the temperature of the process gas is lower than the temperature in the withdrawal portion 29.

Figure 3:
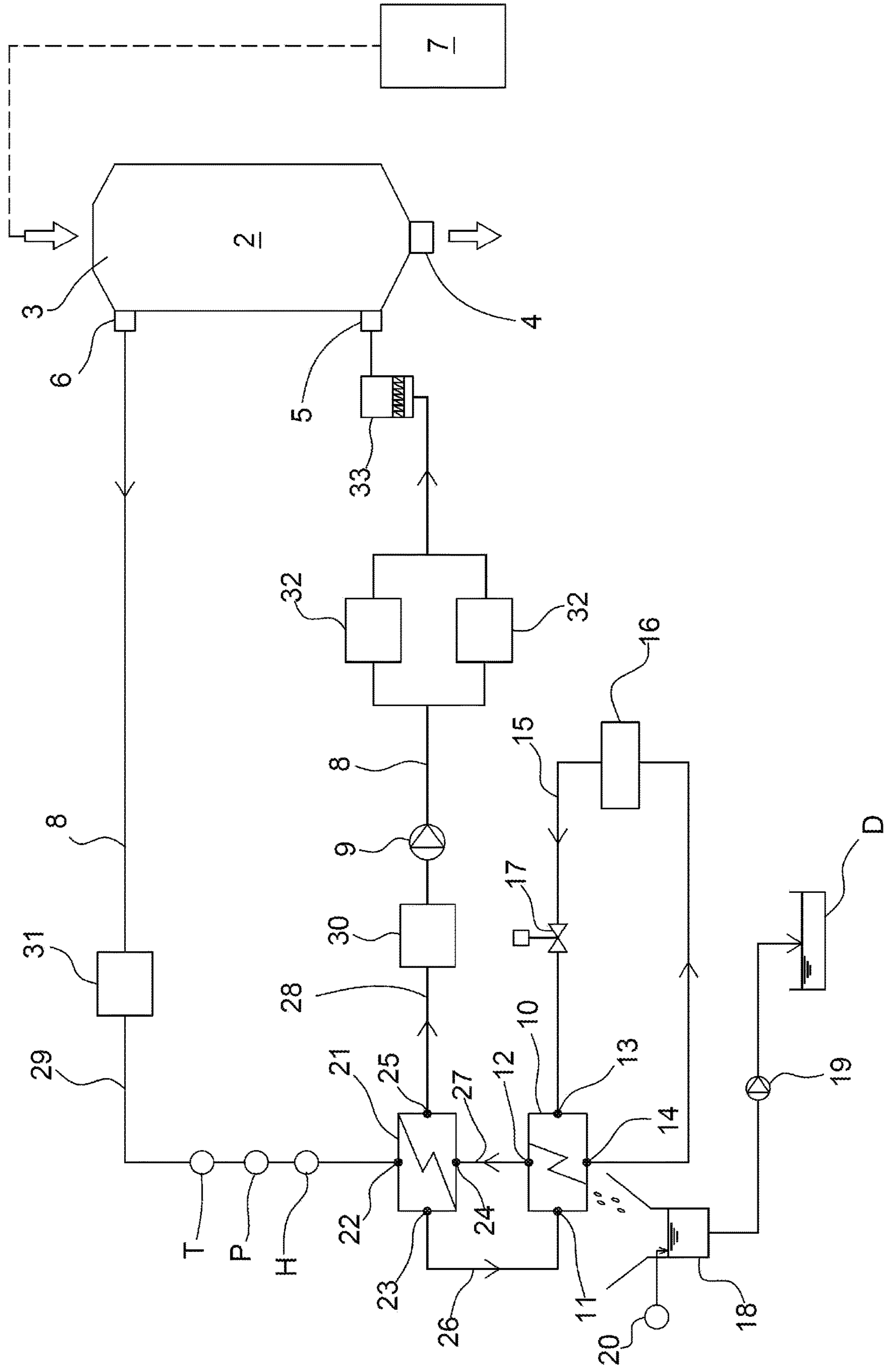
FIG. 3 shows a second embodiment of a treatment apparatus of incoherent plastics in accordance with the present invention.

In the specific embodiment of FIG. 3, the absorption filter 30 works in combination with the dust collector filter 31 in the withdrawal portion 29, which is relatively hotter, of the supply line 8. It has been found that the absorption filter 30 is in this situation particularly effective for substances such as benzene and/or toluene.

Owing to the absorption filter 30 operating upstream of the condenser 10 (as in FIG. 3), it is possible to obtain first purification of the process gas, at a temperature that is significantly higher than condensation temperature. It has been found that this improves the performance of the condenser 10, i.e. enables the contaminating vapours to be extracted effectively with less expenditure of energy to perform cooling of the refrigerating fluid that supplies the condenser 10. Further, this first purification of the process gas reduces the formation of condensate in the condenser 10.

The second purification of the process gas, performed in the condenser 10, is particularly suitable for the substances with a lower boiling point. The exchanger 21 permits not insignificant heat recovery, on the one hand lowering the temperature of the process gas (in particular by a controlled and set amount) at the inlet of the condenser 10, on the other hand raising the temperature of the process gas directed to the place where the incoherent plastics will be treated.

It is possible provide an embodiment, which is not shown, of a treatment apparatus as disclosed above with reference to FIG. 2, in which, in addition to the absorption filter 30 arranged in the delivery portion 28, which is colder, another absorption filter 30 is also arranged in the withdrawal portion 29, which is hotter.

Figure 4:
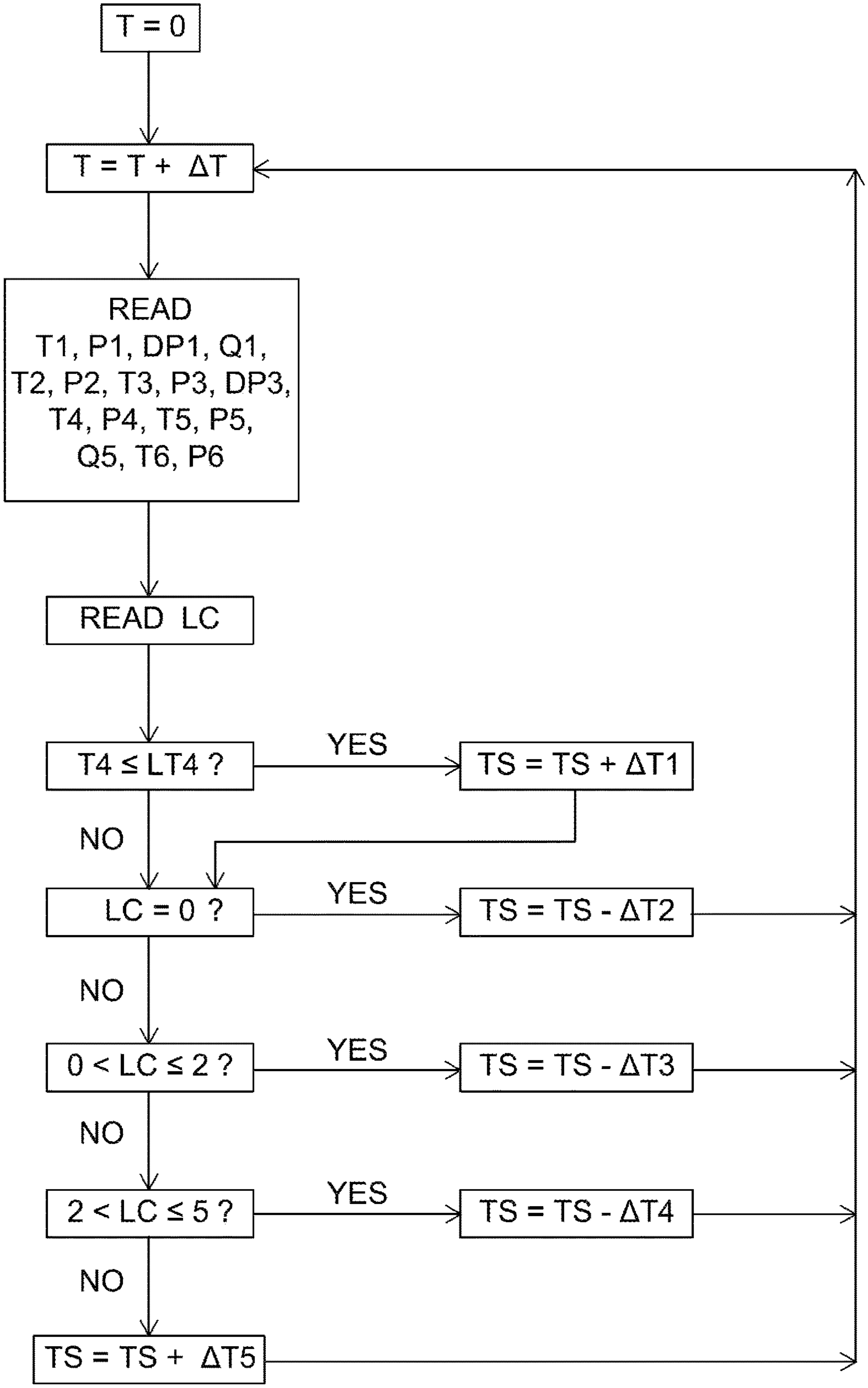
FIG. 4 shows a flow diagram that discloses a possible embodiment of an operating logic of an apparatus in accordance with the present invention.

FIG. 4 shows a flow diagram showing a control algorithm that discloses schematically one merely illustrative and non-limiting embodiment of the invention, of a possible operating logic of an apparatus according to the invention. The logic diagram of FIG. 4 may relate, in particular, to the apparatus diagram of FIG. 3.

The control algorithm, disclosed in the diagram of FIG. 4, enables the correct condensation temperature (or set point value of the temperature TS of the cooling fluid) to be checked and the minimum condensation temperature to be reached that is suitable for obtaining maximum energy performance in operating conditions. The control algorithm adapts, in particular in continuous and interactive mode, the condensation temperature in function of actual required conditions of use.

In particular, the control algorithm adapts the condensation temperature (i.e. the set point value of the temperature TS of the cooling fluid at the inlet 13) as a function of the quantity of contaminants in the material. If this quantity is high, the control will try to obtain maximum condensation (indicated in the flow diagram of six degrees of operation from 0 to 5 of the level of condensation liquid LC). If this quantity is reduced, the control will try to set the temperature so as to minimize the energy impact, i.e. by decreasing the condensation set point value of the temperature TS.

In this specific embodiment of control algorithm, the variation of the cooling intensity supplied by the cooling flow is obtained by varying the temperature of the cooling fluid, i.e. by setting a desired temperature, or set point value of the temperature TS, of the cooling fluid. It is possible, alternatively or additionally, to vary the flowrate of the cooling fluid.

A legend of the symbols used in FIG. 4 follows, which shows an iterative algorithm control cycle:

T=time counter;

T1, P1, DP1, Q1=temperature, pressure, dew point and flowrate of the process fluid at the inlet 22;

T2, P2=temperature and pressure of the process fluid at the outlet 23 or between the outlet 23 and the inlet 11;

T3, P3, DP3=temperature, pressure and dew point of the process fluid at the outlet 12 or between the outlet 12 and the inlet 24;

T4, P4=temperature and pressure of the process fluid at the outlet 25;

T5, P5, Q5=temperature, pressure and flowrate of the cooling fluid at the inlet 13;

T6, P6=temperature and pressure of the cooling fluid at the outlet 14;

TS=set point temperature of the cooling fluid at the inlet 13;

LC=level of condensate;

LT4=reference value (or minimum limit) of the temperature T4 of the process fluid at the outlet 25.

In this specific embodiment, the presence of condensed liquid is detected by a sensor that controls the level of liquid LC with values comprised from 0 to 5, i.e. on the basis of six grades. It is possible to control the level LC on the basis of a different number or grades or a continuous gradation method.

In this specific embodiment, the algorithm controls condensation (in particular the algorithm sets the set point value of the temperature TS of the cooling fluid at the inlet 13) by monitoring, for example continuously, at least one temperature value T1, T2, T3, T4 of the process fluid (in particular the temperature T4 at the outlet 25 that is used in the step "T4≤LT4?"). It is possible to provide an algorithm configured to control condensation by monitoring, for example continuously, at least one dew point value of the process fluid, for example the value DP1 or the value DP3, comparing this dew point value with a reference value.

In the embodiment in FIG. 4, at each cycle the values T1, P1, DP1, Q1, T2, P2, T3, P3, DP3, T4, P4, T5, P5, Q5, T6, P6 are detected. It is possible to detect one or more of these values. In particular, it is possible to detect at least one value, for example the value T4, which in this embodiment is actually used in the algorithm in the step "T4≤LT4?".

With reference to the embodiment in FIG. 4, it is possible to provide ΔT2>ΔT3>ΔT4. It is possible, for example, to set ΔT2=5° C., ΔT3=3° C., ΔT4=1° C., so that, if the level of condensate LC is nil, then the temperature TS is lowered by 5° C., if the level of condensate LC is less than 2, then the temperature TS is lowered by 3° C., if the level of condensate LC is comprised between 2 and 5, then the temperature TS is lowered by 1° C., if the level of condensate LC is greater than 5, then the temperature TS can be increased by ΔT5. In particular, if the measured value of temperature T4 is less than a reference value LT4, then the temperature TS may be increased by ΔT1. It is possible, in particular, to provide ΔT1≥ΔT2 (for example set ΔT1=5° C., or ΔT1=7° C., or ΔT1=9° C.). It is possible, in particular, to provide ΔT5>ΔT4 (for example set ΔT5=1° C., or ΔT5=3° C., or ΔT5=5° C., ΔT5=7° C.).

The algorithm may include, in particular, a number of steps of a logic of automatic learning ("machine learning"). The algorithm may comprise, for example, an initial step in which a set start temperature Tstart of the cooling fluid (set point temperature of the cooling fluid) is stored. The algorithm may comprise, for example, a cycle that is repeated in successive steps in which the set point temperature of the cooling fluid (operating temperature) is reduced over time, starting from the temperature Tstart, for example with a reduction law of linear or of another type, and at the same time the level of condensate is detected. The algorithm could reduce the temperature of the cooling fluid until (at a value Tmin) a significant increase in the level of condensate is no longer detected. The algorithm may consider that the value Tmin corresponds to a desired temperature of the cooling fluid.

The algorithm may comprise, in particular, the acquisition of the value of the temperature T4 measured at the outlet of the condensation system and/or of the value of the level of condensate at the aforesaid value Tmin, so as to establish that such values correspond to a desired operating situation. The algorithm may comprise, in particular, the step of setting an upper operating limit Tsup (for example $Tsup=Tmin+\Delta T$) and/or a lower operating limit Tinf (for example $Tinf=Tmin-\Delta T$) of the operating temperature. The control algorithm imposes, in particular, that each limit Tsup or Tinf is not exceeded. This can make the system particularly stable and/or more reactive with respect to actual operating conditions. Each limit Tsup or Tinf could be set in the installation step of the system and/or in the startup step and/or after startup, using, for example, historic data stored in the course of use.

The control methods and algorithms disclosed above may be implemented, in particular, in order to ensure a correct equilibrium and balance between condensation efficiency and energy consumption.

The invention claimed is:

1. A treatment apparatus for treating plastics or a material containing plastics, the treatment apparatus comprising:

at least one container configured to hold incoherent plastics, the container comprising at least one plastics inlet, at least one plastics outlet, at least one process gas inlet and at least one process gas outlet;

at least one supply line configured to supply a process gas to the process gas inlet of the container;

at least one flow generator configured to generate a process gas flow along the supply line towards the container;

at least one condenser arranged along the supply line configured to condense contaminating vapors contained in the process gas flow, the contaminating vapors comprising organic compound vapors, the condenser comprising at least one contaminated gas inlet and at least one purified gas outlet, wherein a cooling flow is configured to circulate in the condenser to cool the process gas flow to below a boiling point of an organic compound contained in the process gas flow;

at least one exchanger arranged along the supply line configured to cool the process gas flow, the exchanger comprising at least one gas to be cooled inlet, at least one cooled gas outlet, at least one cooling gas inlet and at least one heated gas outlet;

a molecular sieve dehumidification device arranged along a delivery portion and configured to dehumidify the process gas flow, and a processor configured to set an initial operating situation of the cooling flow established at least as a function of: a first parameter that is a type of plastic in the plastics to be treated, a second parameter that is a percentage of recycled plastics present in the material to be treated, or any combination of the first parameter and the second parameter, wherein the supply line comprises at least one connection portion which connects the cooled gas outlet with the contaminated gas inlet, at least one recirculation portion which connects the purified gas outlet with the cooling gas inlet, and at least one delivery portion which connects the heated gas outlet with the process gas inlet of the container.

2. The apparatus according to claim 1, wherein the supply line comprises at least one withdrawal portion which connects a process gas source with the gas to be cooled inlet.

3. The apparatus according to claim 2, wherein the process gas source comprises the process gas outlet of the container, whereby the withdrawal portion connects the process gas outlet of the container with the gas to be cooled inlet.

4. The apparatus according claim 1, comprising at least one absorption filter of an activated carbon type, configured to purify the process gas flow, the absorption filter being arranged along the delivery portion of the supply line.

5. The apparatus according to claim 1, comprising at least one dust collector filter configured to remove dust from the process gas flow, the dust collector filter being arranged along the supply line before the gas to be cooled inlet, wherein before is with respect to a direction of the process gas flow.

6. The apparatus according to claim 1, wherein the organic compound is at least one of acetaldehyde, benzene, toluene, formaldehyde, or methylene.

7. The apparatus according to claim 1, wherein the initial operating situation of the cooling flow includes an initial value of a flowrate of the cooling flow and an initial value of a temperature of the cooling flow.

8. The apparatus according to claim 1, wherein the initial operating situation of the cooling flow includes an initial value a temperature of the cooling flow, and the processor is configured to start a refrigerating circuit, setting the initial operating situation and then lowering a temperature of a refrigerating fluid until a first condensation is obtained.

9. The apparatus according to claim 8, wherein, after the first condensation is obtained by at least one condenser, the processor is configured to control temperature and/or flowrate of the refrigerating fluid such that a forming speed of the condensate is equal to a set value.

10. The apparatus according to claim 1, wherein the processor is configured to set the initial operating situation as a function of a third parameter that is a type of treatment of the incoherent plastics, or any combination of the first, second and third parameters.

11. The apparatus according to claim 1, comprising a sensor configured to detect condensate formed by a condenser, and the processor is configured to adjust the cooling flow based on signals provided by the sensor.

12. The apparatus according to claim 11, wherein the processor is configured to adjust the cooling flow as a function of an amount of condensate formed within a time period detected by the sensor.

13. The apparatus according to claim 12, wherein the processor is configured to increase or decrease a cooling intensity of the cooling flow, respectively, in response to a respective decrease or increase of an amount of condensate formed in the time period.

14. The apparatus according to claim 11, wherein the condenser comprises at least one tank configured to collect the condensate and an evacuation device configured to evacuate the condensate from the tank towards a drain; the sensor comprising a sensor configured to detect a level of condensate collected in the tank.

15. The apparatus according to claim 11, wherein the processor is configured to vary a cooling intensity of the cooling flow by intervening on a flow rate of the cooling flow and/or on a temperature of the cooling flow.

16. The apparatus according to claim 1, wherein the condenser comprises at least one tank configured to collect the condensate and an evacuation device configured to evacuate the condensate from the tank towards a drain.

* * * * *